United States Patent
Aoki et al.

(10) Patent No.: US 11,433,404 B2
(45) Date of Patent: Sep. 6, 2022

(54) CENTRIFUGAL FIELD-FLOW FRACTIONATION DEVICE HAVING A RESTRICTING MEMBER TO PREVENT DEFORMATION OF AN INTERMEDIATE LAYER

(71) Applicant: SHIMADZU CORPORATION, Kyoto (JP)

(72) Inventors: Kengo Aoki, Kyoto (JP); Ryutaro Oda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 431 days.

(21) Appl. No.: 16/471,664

(22) PCT Filed: Dec. 22, 2016

(86) PCT No.: PCT/JP2016/088337
§ 371 (c)(1),
(2) Date: Jun. 20, 2019

(87) PCT Pub. No.: WO2018/116442
PCT Pub. Date: Jun. 28, 2018

(65) Prior Publication Data
US 2020/0001308 A1    Jan. 2, 2020

(51) Int. Cl.
*B04B 1/02* (2006.01)
*B03B 5/32* (2006.01)
*B04B 11/02* (2006.01)

(52) U.S. Cl.
CPC .................. *B04B 1/02* (2013.01); *B03B 5/32* (2013.01); *B04B 11/02* (2013.01)

(58) Field of Classification Search
CPC ......... B04B 1/02; B04B 11/02; B04B 5/0442; B04B 2005/045; B03B 5/32; G01N 2030/007; G01N 30/0005

(Continued)

(56) References Cited

U.S. PATENT DOCUMENTS

2006/0151403 A1    7/2006  Cardot
2012/0234731 A1*   9/2012  Senftleber .......... G01N 30/0005
                                                209/39
2014/0066280 A1    3/2014  Welz

FOREIGN PATENT DOCUMENTS

EP    0035397       9/1981
EP    0035397 A2 *  9/1981  ............... B04B 5/04
(Continued)

OTHER PUBLICATIONS

International Search Report for PCT/JP2016/088337 dated Feb. 7, 2017 [PCT/ISA/210].

(Continued)

*Primary Examiner* — Walter D. Griffin
*Assistant Examiner* — Shuyi S. Liu
(74) *Attorney, Agent, or Firm* — Sughrue Mion, PLLC

(57) ABSTRACT

A centrifugal field-flow fractionation device includes an annular rotor, an arc-shaped channel member, a rotation drive unit, and a restriction unit. A channel member 16 is provided along an inner peripheral surface of the rotor, has therein a channel 161 for a liquid sample by laminating a plurality of layers, and has an inlet for the liquid sample to the channel 161 and an outlet for the liquid sample from the channel 161. By rotating the rotor, particles in the liquid sample in the channel 161 are classified by centrifugal force. A restriction spacer 64 restricts the channel 161 from being compressed to a height less than a certain height when the channel member 16 is compressed and deformed in a laminating direction.

7 Claims, 12 Drawing Sheets

(58) Field of Classification Search
USPC .......................................................... 494/23
See application file for complete search history.

(56) References Cited

FOREIGN PATENT DOCUMENTS

| | | |
|---|---|---|
| EP | 2 524 732 A1 | 11/2012 |
| JP | 2-43965 A | 2/1990 |
| JP | 2014-518761 A | 8/2014 |

OTHER PUBLICATIONS

Written Opinion for PCT/JP2016/088337 dated Feb. 7, 2017 [PCT/ISA/237].

* cited by examiner

CENTRIFUGAL FIELD-FLOW FRACTIONATION DEVICE HAVING A RESTRICTING MEMBER TO PREVENT DEFORMATION OF AN INTERMEDIATE LAYER

TECHNICAL FIELD

The present invention relates to a centrifugal field-flow fractionation device that causes a liquid sample to flow into a channel provided along an inner peripheral surface of an annular rotor and causes the rotor to rotate so that particles in the liquid sample in the channel are classified by centrifugal force.

BACKGROUND ART

Field flow fractionation has been known as a method for classifying particles contained in a liquid sample according to the size and specific gravity. For example, Patent Document 1 below discloses an example of a centrifugal field-flow fractionation device that classifies particles in a liquid sample by centrifugal force by causing the liquid sample to flow into a channel and rotating the channel.

The centrifugal field-flow fractionation device includes, for example, a rotor, a channel member, and a fixing member. The rotor is formed into an annular shape, and is rotatably held about a rotational axis. The channel member has, for example, a three-layer structure, and layers are sequentially laminated in a state where each layer is curved in an arc shape along the inner peripheral surface of the rotor. The fixing member is a C-shaped member extending in an arc shape along an inner peripheral surface (layer closest to the rotational axis) of the channel member.

Each of the layers constituting the channel member has an elongated shape, and includes an intermediate layer (see FIG. 5 of Patent Document 1) in which an opening portion extending in the longitudinal direction is formed, and an outer surface layer and an inner surface layer (see FIGS. 4(a) and (b) of Patent Document 1) that form a channel therebetween by sandwiching the intermediate layer and closing the outside and inside of the opening portion. The inner surface layer is formed with an inlet and an outlet each having a through hole communicating with the channel, so that a liquid sample can flow into the channel through the inlet, and the liquid sample can flow out of the channel through the outlet.

The layers of the channel member as described above are laminated in a curved state along the outer peripheral surface of the fixing member, and attached to the fixing member using a bolt or a pin. The fixing member to which the channel member is attached is inserted into a space inside the rotor and fixed along the inner peripheral surface of the rotor so as to sandwich the channel member between the rotor and the fixing member. At this time, by attaching the wedge-shaped member between both end portions of the C-shaped fixing member, a force is applied in a direction in which the both end portions are expanded (see FIG. 6 of Patent Document 1). Thus, the C-shaped fixing member is fixed so as to be strongly pressed against the inner peripheral surface side of the rotor, and the channel member is sandwiched between the fixing member and the rotor.

In the centrifugal field-flow fractionation device assembled as described above, by rotating the rotor, the channel member attached to the rotor can be rotated to apply centrifugal force to the liquid sample in the channel. As a result, particles contained in the liquid sample flowing into the channel from the inlet flow out of the outlet at different timings according to the size and specific gravity. Thus, the particles in the liquid sample are classified according to size and specific gravity.

PRIOR ART DOCUMENT

Patent Document

Patent Document 1: Japanese Translation of PCT International Application Publication No. JP-T-2014-518761

SUMMARY OF THE INVENTION

Problems to be Solved by the Invention

However, in the conventional structure as described above, since the laminated outer surface layer, the intermediate layer, and the inner surface layer are attached while being compressed in the laminating direction, the intermediate layer sandwiched between the outer surface layer and the inner surface layer is deformed, and there is a possibility that the height of the channel changes. In a centrifugal field-flow fractionation device, the height of the channel is an extremely important parameter, and if the height of the channel changes, the intended analysis performance may not be exerted. In particular, when the intermediate layer is formed of a soft material such as resin, the intermediate layer is liable to be deformed, and hence the height of the channel is liable to vary.

The present invention has been made in view of the above circumstances, and it is an object of the present invention to provide a centrifugal field-flow fractionation device capable of maintaining a certain height of a channel.

Means for Solving the Problems

A centrifugal field-flow fractionation device according to the present invention includes an annular rotor, an arc-shaped channel member, a rotation drive unit, and a restriction unit. The rotor rotates about a rotational axis. The channel member is provided along the inner peripheral surface of the rotor, has therein a channel for a liquid sample by laminating a plurality of layers, and has an inlet for the liquid sample to the channel and an outlet for the liquid sample from the channel. The rotation drive unit, by rotating the rotor, classifies particles in the liquid sample in the channel by centrifugal force. The restriction unit restricts the channel from being compressed to a height less than a certain height when the channel member is compressed and deformed in the laminating direction.

According to such a configuration, even when the channel member is compressed and deformed in the laminating direction, the restriction unit is capable of restricting the channel from being compressed to a height less than a certain height, and hence the height of the channel can be maintained at a certain height. Depending on the type of the liquid sample flowing in the channel, the member that forms the channel may need to be formed of a soft material such as resin, but even in such a case, the height of the channel can be reliably maintained at a certain height by the restriction unit.

The height of the channel can be easily adjusted by arbitrarily setting the thickness of the restriction unit. Furthermore, the height of the channel is less likely to vary during assembly of the channel member, and assembly reproducibility is improved. Since the width of the material that can be used as the plurality of layers constituting the channel member is increased, it is possible to configure the channel according to the type of the liquid sample.

The plurality of layers may include an outer surface layer provided on the rotor side, an inner surface layer provided on the rotational axis side, and an intermediate layer provided between the outer surface layer and the inner surface layer and having the channel. In this case, the restriction unit may be provided between the outer surface layer and the inner surface layer.

According to such a configuration, it is possible to restrict the channel formed in the intermediate layer from being compressed to a height less than a certain height by a simple configuration in which a restriction unit is simply provided between the outer surface layer and the inner surface layer.

The restriction unit may be provided between the outer surface layer and the inner surface layer while surrounding the outer periphery of the intermediate layer.

According to such a configuration, since the restriction unit is fixed in a state of surrounding the outer periphery of the intermediate layer, it is possible to prevent the restriction unit from falling off without fixing the restriction unit by adhesion or the like. In this case, since variations in the height of the channel according to the thickness of the adhesive can be prevented, the height of the channel can be maintained at a certain height with higher accuracy.

The centrifugal field-flow fractionation device may further include a positioning unit that positions the restriction unit with respect to the intermediate layer.

According to such a configuration, since the restriction unit is positioned with respect to the intermediate layer by the positioning unit, it is possible to prevent the restriction unit from falling off without fixing the restriction unit by adhesion or the like. In this case, since variations in the height of the channel according to the thickness of the adhesive can be prevented, the height of the channel can be maintained at a certain height with higher accuracy.

The plurality of layers may include an outer surface layer provided on the rotor side and an inner surface layer provided on the rotational axis side. In this case, the restriction unit may be provided on at least one of the outer surface layer and the inner surface layer.

According to such a configuration, it is possible to restrict the channel from being compressed to a height less than a certain height by a simple configuration in which the restriction unit is provided in at least one of the outer surface layer and the inner surface layer.

The centrifugal field-flow fractionation device may further include a compression unit that compresses the channel member in the laminating direction. In this case, the restriction unit may be provided in the compression unit.

According to such a configuration, when the channel member is compressed by the compression unit in the laminating direction, the restriction unit provided in the compression unit is capable of restricting the channel from being compressed to a height less than a certain height.

The restriction unit may be formed of a material such that a pressure σ when the channel member is compressed in the laminating direction is larger than a lower limit value σ1 and smaller than an upper limit value σ2. The lower limit value σ1 is the pressure of the liquid sample in the channel. The upper limit value σ2 is a pressure necessary to reduce the restriction unit by a predetermined shrinkage amount when the pressure from the liquid sample in the channel does not act.

According to this configuration, since the restriction unit can be formed of an appropriate material, it is possible to prevent leakage of the liquid sample in the channel and shrinkage of the restriction unit in excess of a predetermined shrinkage amount (maximum allowable change amount).

Effects of the Invention

According to the present invention, even when the plurality of layers constituting the channel member are compressed and deformed in the laminating direction, the height of the channel can be maintained at a certain height by the restriction unit.

MODE FOR CARRYING OUT THE INVENTION

Figure 1:
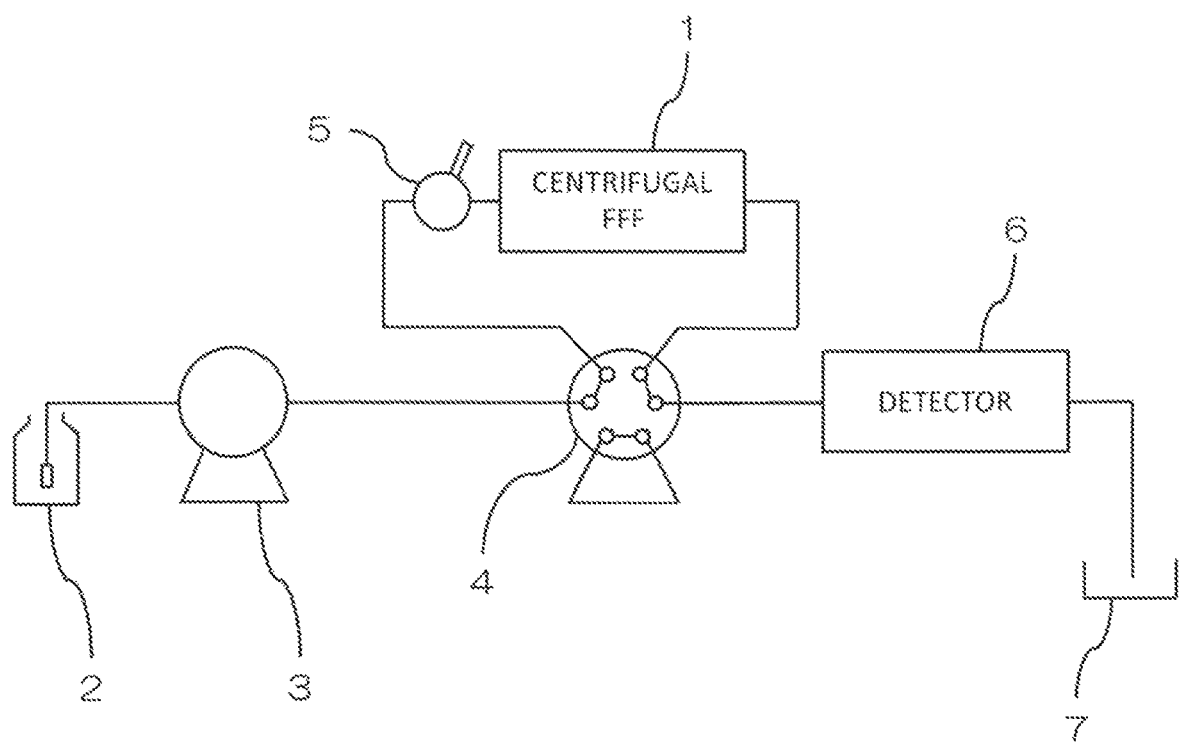
FIG. 1 is a schematic view showing a configuration example of an analysis system provided with a centrifugal field-flow fractionation device according to an embodiment of the present invention.

FIG. 1 is a schematic view showing a configuration example of an analysis system provided with a centrifugal field-flow fractionation device 1 according to an embodiment of the present invention. The centrifugal field-flow fractionation device 1 classifies particles contained in a liquid sample according to their size and specific gravity by using field flow fractionation. The analysis system shown in FIG. 1 includes a carrier storage unit 2, a liquid feed pump 3, a rotary valve 4, a sample injection device 5, a detector 6, and a carrier collection unit 7, in addition to the centrifugal field-flow fractionation device 1.

The carrier storage unit 2 stores a carrier fluid made of, for example, water or an organic solvent. The carrier fluid is fed from the carrier storage unit 2 by the liquid feed pump 3, and is supplied to the centrifugal field-flow fractionation device 1 via the rotary valve 4. The sample injection device 5 is provided between the rotary valve 4 and the centrifugal field-flow fractionation device 1, and the carrier fluid injected with the sample from the sample injection device 5 is supplied to the centrifugal field-flow fractionation device 1 as a liquid sample.

The liquid sample contains a large number of particles to be analyzed. The particles contained in the liquid sample are classified by centrifugal force in the centrifugal field-flow fractionation device 1, and are discharged from the centrifugal field-flow fractionation device 1 at different timings according to the size and specific gravity. The particles flowing out sequentially from the centrifugal field-flow fractionation device 1 are sent to the detector 6 together with the carrier fluid via the rotary valve 4, and after being detected by the detector 6, they are collected by the carrier collection unit 7. The start or stop of the supply of the liquid sample to the centrifugal field-flow fractionation device 1 can be switched by rotating the rotary valve 4.

Figure 2:
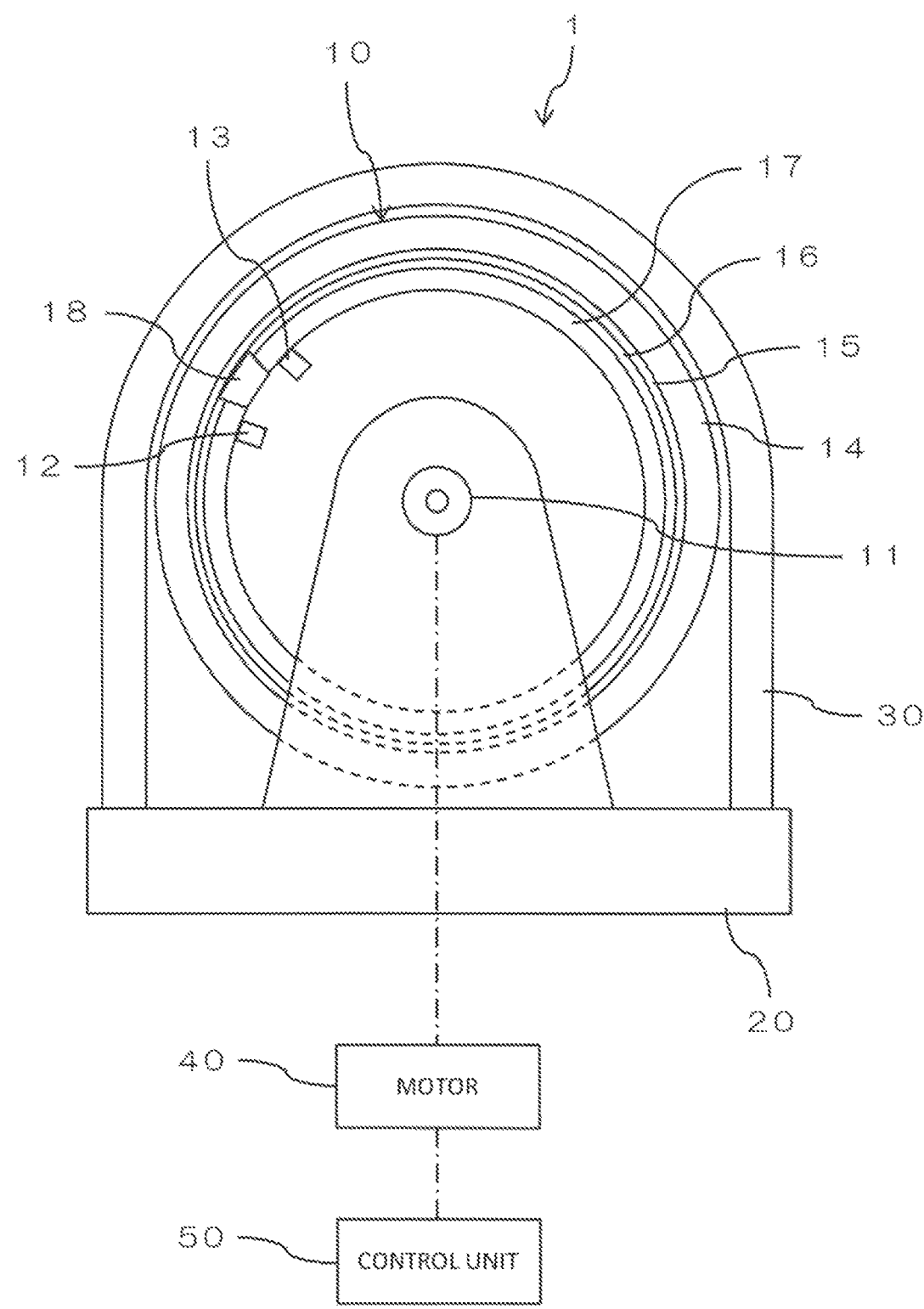
FIG. 2 is a schematic front view showing a configuration example of the centrifugal field-flow fractionation device.

FIG. 2 is a schematic front view showing a configuration example of the centrifugal field-flow fractionation device 1. The centrifugal field-flow fractionation device 1 is constituted by assembling a rotation unit 10 that rotates about a rotational shaft 11, a holding table 20 that rotatably holds the rotational shaft 11, and a protective wall 30 that prevents an operator from contacting the rotation unit 10.

The rotation unit 10 is formed in a cylindrical shape, for example, and is held by the holding table 20 so that the rotational shaft 11 attached to the center portion thereof extends horizontally. The protective wall 30 is, for example, a U-shaped member curved in a shape corresponding to the outer peripheral surface of the rotation unit 10, and is mounted on the holding table 20 in a state of facing each other across a small interval with respect to the outer peripheral surface so as to cover the outer peripheral surface of the rotation unit 10.

The rotational shaft 11 is formed in a hollow shape, and a liquid sample is supplied into the rotational shaft 11 from, for example, one end of the rotational shaft 11. The rotation unit 10 is provided with an introduction unit 12 into which the liquid sample before classification is introduced, and a discharge unit 13 from which the liquid sample after classification is discharged. The introduction unit 12 and the discharge unit 13 communicate with each other into the rotational shaft 11 via a pipe (not shown). Thus, the liquid sample supplied into the rotational shaft 11 is introduced into the rotation unit 10 from the introduction unit 12 via the pipe, and after the particles in the sample liquid are classified in the rotation unit 10, the liquid sample is guided to the rotational shaft 11 via the pipe from the discharge unit 13 and sent to the detector 6.

A motor 40, which is an example of a rotation drive unit, is connected to the rotational shaft 11. By driving the motor 40, the rotation unit 10 is rotated to apply a centrifugal force to the liquid sample in the rotation unit 10. The driving of the motor 40 is controlled by a control unit 50 including, for example, a CPU (Central Processing Unit). However, the rotation unit 10 can also be rotated by using a rotation drive unit other than the motor 40.

Figure 3:
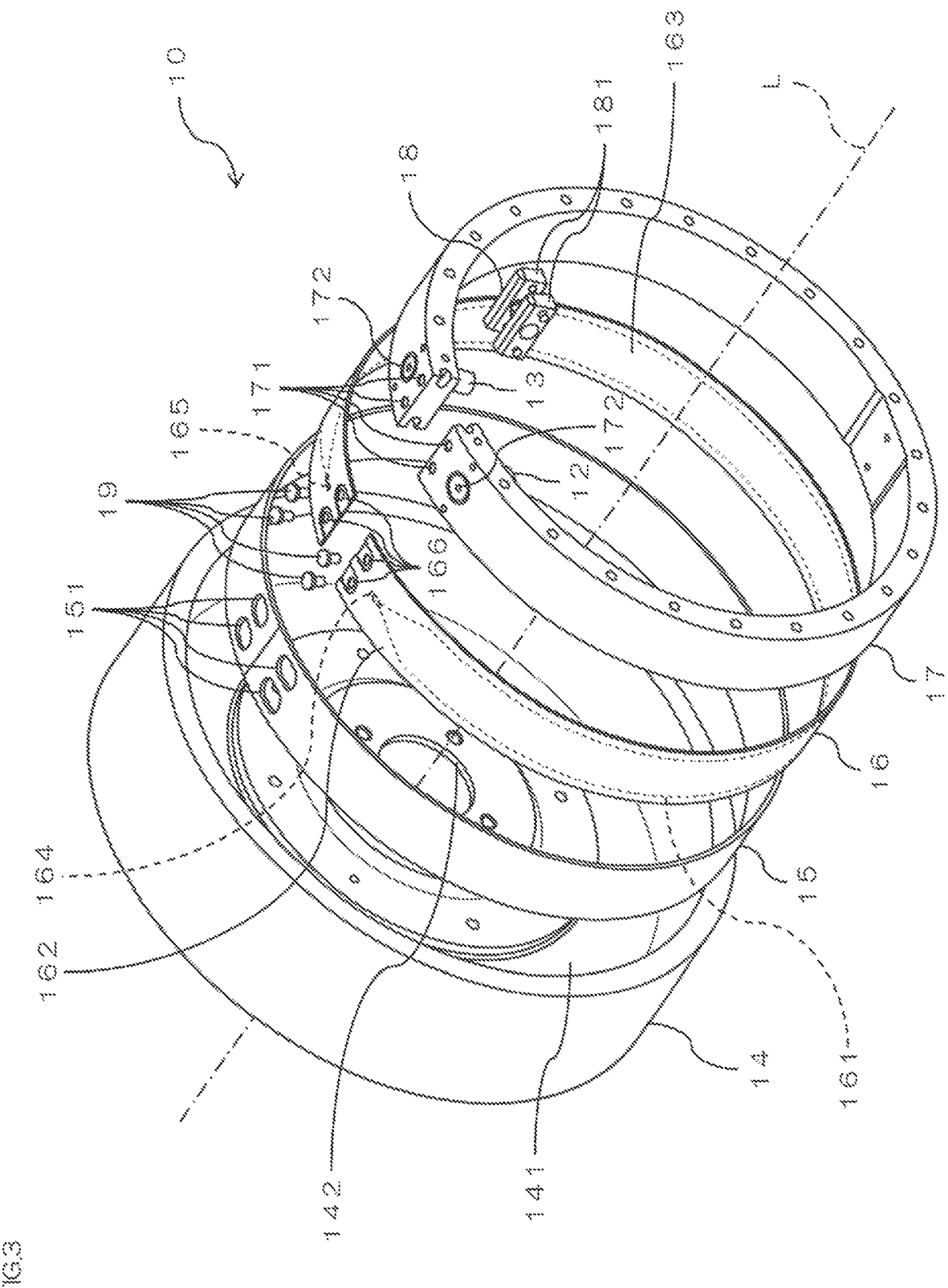
FIG. 3 is an exploded perspective view showing a configuration example of a rotation unit.

FIG. 3 is an exploded perspective view showing a configuration example of the rotation unit 10. The rotation unit 10 is configured as a cylindrical member as a whole by assembling, for example, a rotor 14, a spacer 15, a channel member 16, a fixing member 17, a wedge-shaped member 18, and the like.

The rotor 14 is an annular member, and one end face thereof is closed by an end face wall 141. The end face wall 141 is formed in a disk shape, and has an insertion hole 142 for receiving the rotational shaft 11 in the central portion thereof. By inserting the rotational shaft 11 into the insertion hole 142 and fixing it to the end face wall 141, the rotor 14 can be rotated about a rotational axis L coaxial with the rotational shaft 11 as the rotational shaft 11 rotates.

The spacer 15, the channel member 16, the fixing member 17, and the wedge-shaped member 18 are accommodated in a space inside (the rotational axis L side) the rotor 14. Each of the spacer 15, the channel member 16, and the fixing member 17 has a shape in which an elongated member is curved in an arc shape, and is fixed along the inner peripheral surface of the rotor 14 in a state of being laminated in this order. The radii of curvature of the spacer 15, the channel member 16, and the fixing member 17 are, for example, about 50 to 200 mm.

The channel member 16 is, for example, a thin plate with a thickness of 1 mm or less, and is formed into a C shape by both end portions in the circumferential direction facing each other across an interval. A channel 161 extending in the circumferential direction is formed in the channel member 16. That is, the channel member 16 has an arc-shaped outer peripheral surface 162 formed on the rotor 14 side and an arc-shaped inner peripheral surface 163 formed on the rotational axis L side, and the channel 161 is formed between the outer peripheral surface 162 and the inner peripheral surface 163.

An inlet 164 for the liquid sample to the channel 161 is formed at one circumferential end of the inner peripheral surface 163 of the channel member 16. On the other hand, an outlet 165 for the liquid sample from the channel 161 is formed at the other circumferential end of the inner peripheral surface 163 of the channel member 16. Accordingly, the liquid sample flowing into the channel 161 from the inlet 164 flows in the channel 161 along the circumferential direction from one end to the other end, and flows out from the outlet 165.

When the particles in the liquid sample are classified, first, the rotation unit 10 is rotated by driving of the motor 40, and the rotational speed of the rotation unit 10 is gradually increased. When the rotational speed of the rotation unit 10 reaches a certain value (for example, 5000 rpm), the liquid sample is injected from the inlet 164 while the rotational speed is maintained.

After the liquid sample is injected into the channel 161 for a certain period of time, the supply of the liquid sample is stopped by switching of the rotary valve 4, and the rotation unit 10 is rotated as it is. Consequently, the particles in the liquid sample in the channel 161 are centrifugally precipitated. Thereafter, the supply of the liquid sample is resumed by the switching of the rotary valve 4, and the rotational speed of the rotation unit 10 is gradually lowered after a predetermined period of time.

As a result, particles, in ascending order of size and specific gravity in the liquid sample, are sequentially sent downstream along the flow of the liquid sample in the channel 161, and flow out sequentially from the outlet 165. In this way, the particles in the liquid sample in the channel 161 are classified by centrifugal force, flow out from the outlet 165 at different timings according to the size and specific gravity, and are sent to the detector 6.

The fixing member 17 is a member having a thickness larger than that of the channel member 16, and is formed to have a thickness of about 10 mm, for example. Similar to the channel member 16, the fixing member 17 is formed into a C-shape by the both circumferential end portions facing each other across an interval. The circumferential length of the fixing member 17 is substantially the same as the circumferential length of the channel member 16. The fixing member 17 is provided inside (the rotational axis L side) the channel member 16 along the inner peripheral surface 163 of the channel member 16.

A plurality of screw holes 171 for receiving a bolt 19, which is an example of a locking tool, are formed at both circumferential end portions of the fixing member 17. A plurality of insertion holes 166 are formed at both circumferential end portions of the channel member 16 at positions facing the respective screw holes 171 of the fixing member 17. Thus, the bolt 19 is inserted into each of the insertion holes 166 from the outside and screwed into each of the screw holes 171. Thus, the channel member 16 can be attached to the fixing member 17. However, the locking tool is not limited to the bolt 19, and may be constituted by another member such as a pin.

Through holes 172 are formed at respective circumferential end portions of the fixing member 17 at positions facing the inlet 164 and the outlet 165 that are formed on the inner peripheral surface 163 of the channel member 16. The introduction unit 12 and the discharge unit 13 are attached to the inner peripheral surface of the fixing member 17 so as to communicate with the respective through holes 172. As a result, the liquid sample introduced from the introduction unit 12 flows into the channel 161 from the inlet 164 via one of the through holes 172, flows in the channel 161 in the circumferential direction, and then is discharged from the outlet 165 via the other through hole 172 and the discharge unit 13.

The channel 161 in the channel member 16 is set to a different height depending on the type of the carrier fluid, the condition of the analysis, and the like. Therefore, the channel member 16 is formed to have a different thickness in accordance with the height of the channel 161, and an optimum channel member 16 is selected from a plurality of types of channel member 16 and attached to the fixing member 17.

The fixing member 17 to which the channel member 16 is attached as described above is inserted into a space inside the rotor 14 and fixed along the inner peripheral surface of the rotor 14 so as to sandwich the channel member 16 between the rotor 14 and the fixing member 17. At this time, by attaching the wedge-shaped member 18 between both end portions of the C-shaped fixing member 17, a force is applied in a direction in which the both end portions are expanded.

As a result, the C-shaped fixing member 17 is strongly pressed against the inner peripheral surface side of the rotor 14, and the channel member 16 is pressed against and fixed to the rotor 14 side. When the particles in the liquid sample are classified, the inside of the channel 161 becomes high pressure (for example, about 1 MPa) due to the high-speed rotation of the rotor 14, and the pressure difference between the inside and the outside of the channel 161 increases. However, by sandwiching the channel member 16 between the fixing member 17 and the rotor 14, the outer peripheral surface 162 and the inner peripheral surface 163 of the channel member 16 can be prevented from being deformed to the side opposite to the channel 161 side by the pressure difference.

In this embodiment, the spacer 15 is sandwiched between the channel member 16 and the rotor 14. The material of the spacer 15 is not particularly limited, but is formed of, for example, a resin such as PET (Polyethylene Terephthalate) or PEEK (Polyetherketoneketone) or metal. The spacer 15 is formed to be slightly longer than the channel member 16, and long holes 151 are formed at both circumferential end portions of the spacer 15 at positions facing the respective insertion holes 166 of the channel member 16.

The head of the bolt 19 inserted into each of the insertion holes 166 of the channel member 16 is accommodated in each of the long holes 151 of the spacer 15. Each of the long holes 151 is formed to extend in the circumferential direction. Thus, when both end portions of the fixing member 17 are expanded by the wedge-shaped member 18 and the fixing member 17 is strongly pressed against the inner peripheral surface side of the rotor 14 while the head of each of the bolts 19 is accommodated in the respective long holes 151, the spacer 15 and the channel member 16 are sandwiched between the fixing member 17 and the rotor 14 while the head of each of the bolts 19 slides in the circumferential direction in the respective long holes 151.

The spacer 15 is, for example, a thin plate with a thickness of 1 mm or less, and a spacer with a different thickness according to the thickness of the channel member 16 is selected. That is, the spacer 15 having the optimum thickness is selected so that the total value of the thickness of the spacer 15 and the thickness of the channel member 16 is substantially constant. The spacer 15 also has a function of preventing damage to the inner peripheral surface of the rotor 14. However, the spacer 15 can be omitted.

Figure 4:
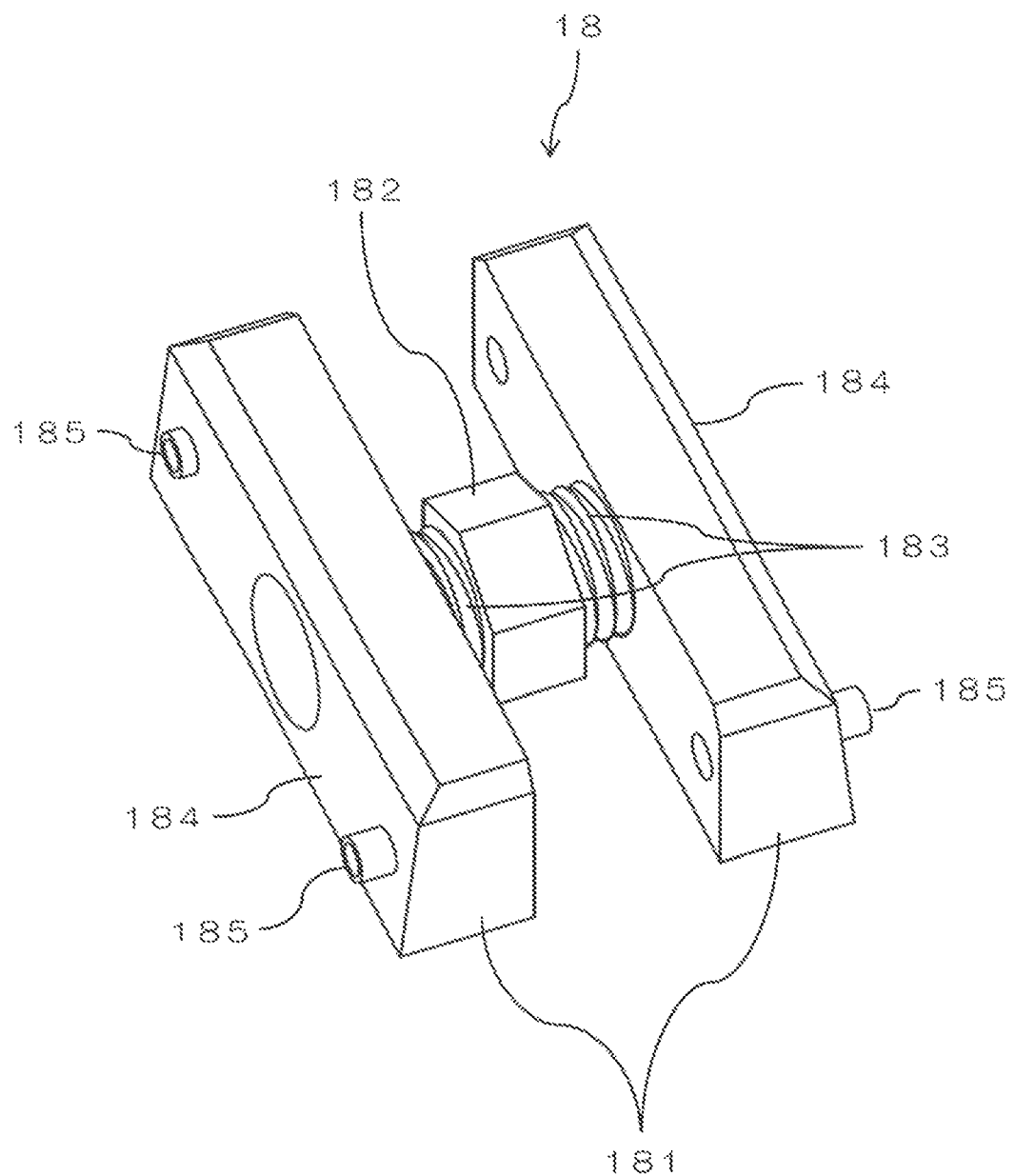
FIG. 4 is a perspective view showing a configuration example of a wedge-shaped member.

FIG. 4 is a perspective view showing a configuration example of the wedge-shaped member 18. The wedge-shaped member 18 includes, for example, two nut portions 181 and one bolt portion 182. The bolt portion 182 has two shaft portions 183 extending in opposite directions to each other along the axial direction, where one shaft portion 183 is formed with a right screw, and the other shaft portion 183 is formed with a left screw.

The two nut portions 181 face each other across the bolt portion 182, where one shaft portion 183 of the bolt portion 182 is screwed into one nut portion 181, and the other shaft portion 183 of the bolt portion 182 is screwed into the other nut portion 181. Therefore, the two nut portions 181 can be brought close to each other if the bolt portion 182 is rotated in one direction, and the two nut portions 181 can be separated from each other if the bolt portion 182 is rotated in the opposite direction.

The wedge-shaped member 18 is provided between both end portions of the C-shaped fixing member 17, and the surfaces of the nut portions 181 on the side opposite to the bolt portion 182 side constitute contact surfaces 184 that respectively come into contact with the both end surfaces of the fixing member 17. Therefore, the pressing force of the fixing member 17 toward the rotor 14 can be adjusted, and the fixing member 17 can be attached or detached by rotating the bolt portion 182 in a state where the contact surfaces 184 each come into contact with the both end surfaces of the fixing member 17 and by enlarging or reducing the interval between the both end portions of the fixing member 17.

The contact surface 184 of each of the nut portions 181 is formed by a tapered surface that gradually tapers outward (the rotor 14 side). Both end surfaces of the fixing member 17 in contact with these contact surfaces 184 are also formed by tapered surfaces such that the end surfaces gradually approach each other toward the outside (the rotor 14 side).

Therefore, in a state where the wedge-shaped member 18 is provided between the both end portions of the fixing member 17, when the interval between the both end portions of the fixing member 17 is widened by rotating the bolt portion 182 to separate the two nut portions 181 from each other, the contact surfaces 184 of the nut portions 181 push the both end surfaces of the fixing member 17 outward (the rotor 14 side). Thus, the fixing member 17 can be pressed against the rotor 14 side with a higher pressing force.

One or more projections 185 are formed on the contact surface 184 of each of the nut portions 181, and the wedge-shaped member 18 is positioned between the both end portions of the fixing member 17 by engaging the projections 185 with recesses (not shown) formed on the both end surfaces of the fixing member 17. However, a configuration may be adopted in which a recess is formed on the wedge-shaped member 18 side and a projection is formed on the fixing member 17 side.

Moreover, the wedge-shaped member 18 is not limited to have the above-described configuration, and any other configuration may be adopted as long as the fixing member can be fixed so as to press the fixing member 17 toward the rotor 14.

Figure 5:
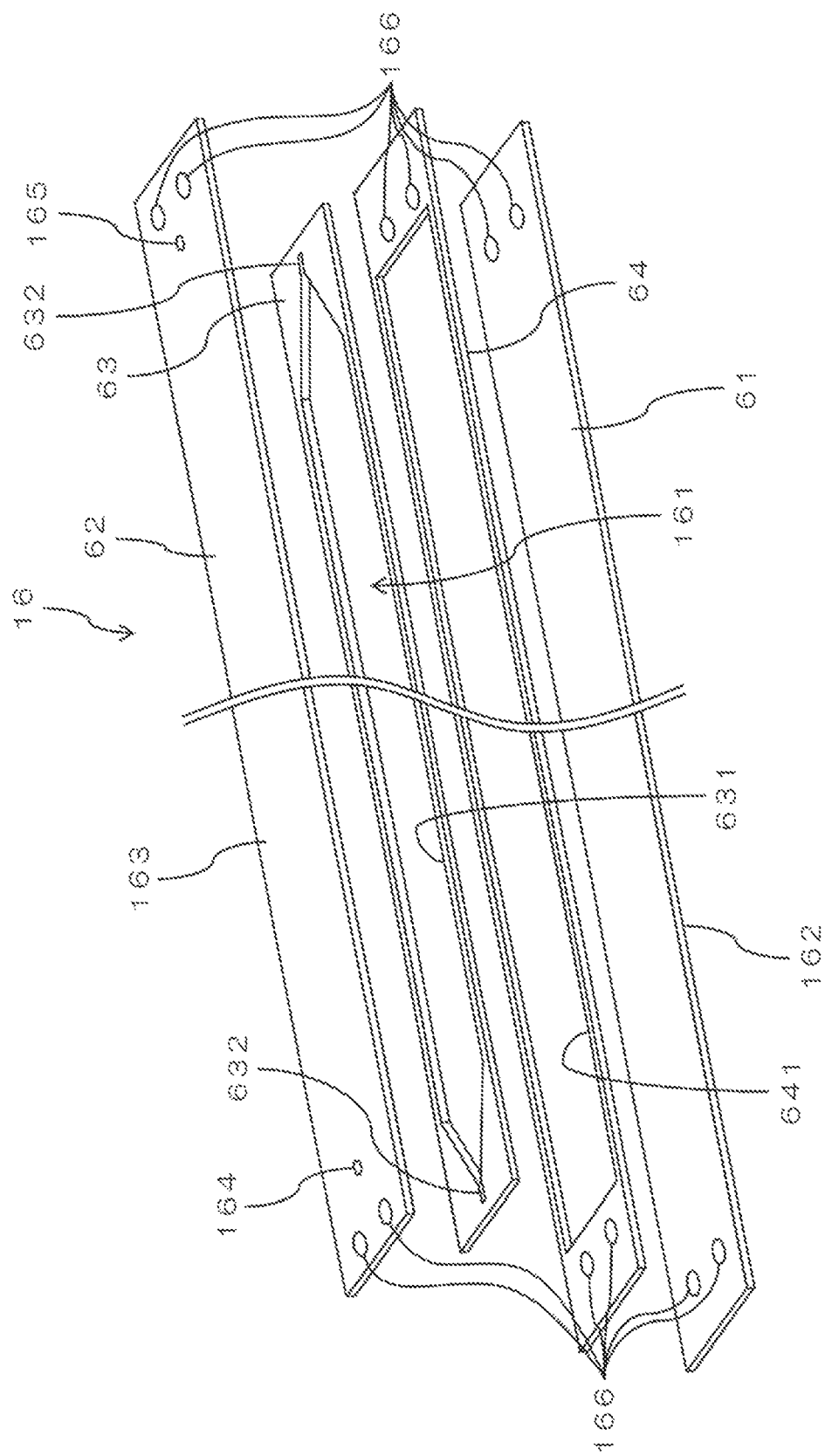
FIG. 5 is an exploded perspective view showing a configuration example of a channel member, showing, as viewed from a inner peripheral surface side, a state before the channel member is curved in an arc shape.

FIG. 5 is an exploded perspective view showing a configuration example of the channel member 16, showing, as viewed from the inner peripheral surface 163 side, a state before the channel member 16 is curved in an arc shape. The channel member 16 is formed of, for example, a laminate including an outer surface layer 61, an inner surface layer 62, an intermediate layer 63, and a restriction spacer 64.

The channel 161 for the liquid sample is formed of a three-layer structure of the outer surface layer 61, the inner surface layer 62, and the intermediate layer 63. The intermediate layer 63 is provided between the outer surface layer 61 and the inner surface layer 62. The outer surface layer 61 and the inner surface layer 62 each have a thickness of about 0.2 mm. The intermediate layer 63 is formed of a material different from that of the outer surface layer 61 and the inner surface layer 62, and has a thickness of, for example, about 0.3 mm.

Figure 6:
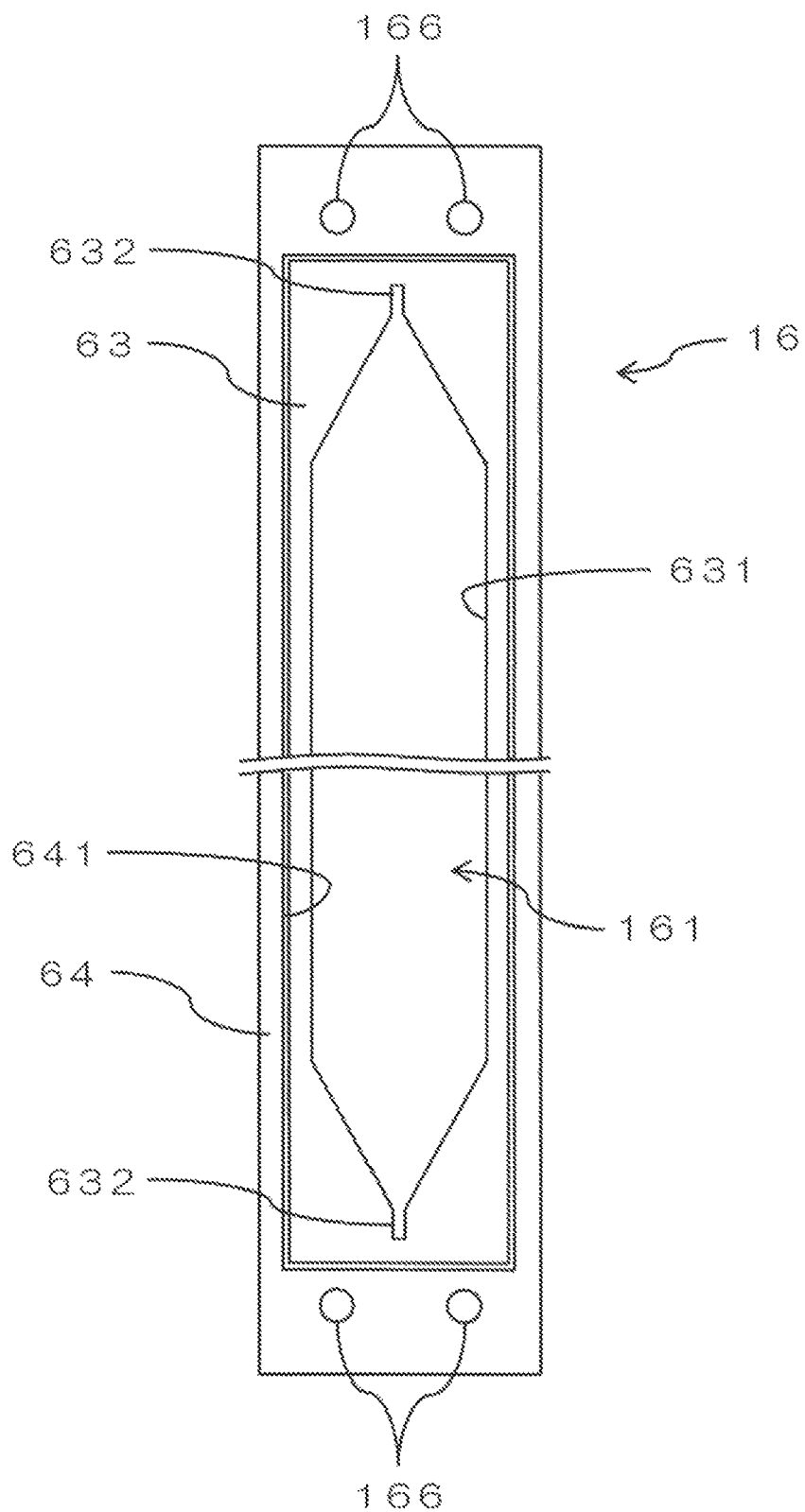
FIG. 6 is a plan view showing an intermediate layer and a restriction spacer in a state where the channel member is assembled.
Figure 7:
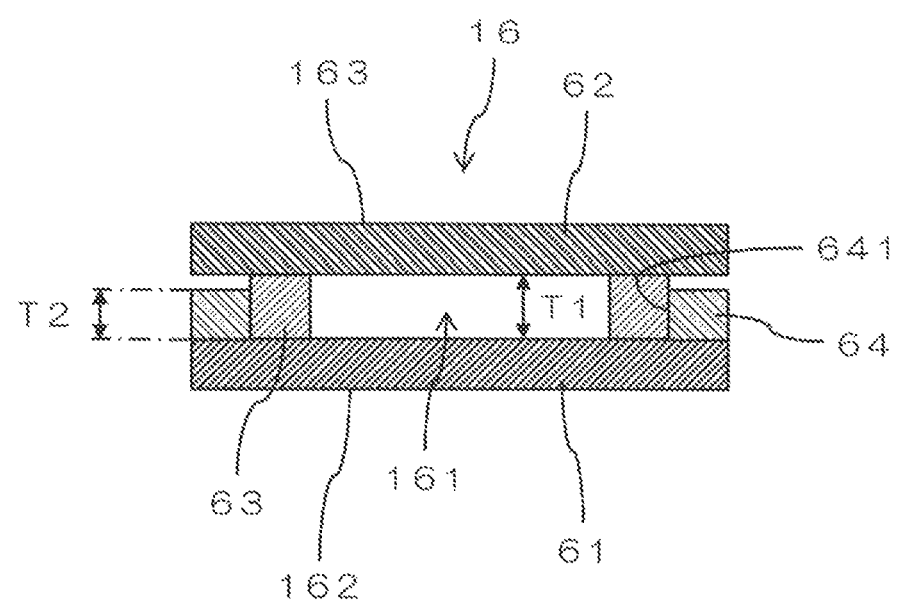
FIG. 7 is a sectional view of the assembled channel member.

FIG. 6 is a plan view showing the intermediate layer 63 and the restriction spacer 64 in a state where the channel member 16 is assembled. FIG. 7 is a sectional view of the assembled channel member 16. As shown in FIGS. 6 and 7, when the channel member 16 is assembled, the restriction spacer 64 is provided between the outer surface layer 61 and the inner surface layer 62 while surrounding the intermediate layer 63.

Specifically, the intermediate layer 63 is formed in a rectangular shape smaller than the restriction spacer 64, and is disposed in a rectangular opening portion 641 formed in the restriction spacer 64. The opening portion 641 is formed in the same or slightly larger shape than the planar shape of the intermediate layer 63. The restriction spacer 64 has the same outer shape as the outer surface layer 61 and the inner surface layer 62 in plan view, and when the channel member 16 is assembled, the intermediate layer 63 is contained in the laminated outer surface layer 61, the inner surface layer 62, and the restriction spacer 64.

The surface of the outer surface layer 61 on the side opposite to the intermediate layer 63 side constitutes the outer peripheral surface 162 of the channel member 16 when the channel member 16 is curved in an arc shape. The surface of the inner surface layer 62 on the side opposite to the intermediate layer 63 side constitutes the inner peripheral surface 163 of the channel member 16 when the channel member 16 is curved in an arc shape.

An opening portion 631 that penetrates the intermediate layer 63 and extends straight in the longitudinal direction is formed in the intermediate layer 63. Both end portions in the longitudinal direction of the opening portion 631 are formed in a gradually tapered triangular shape, and each tip is an elongated port portion 632 that projects in the longitudinal direction. The intermediate layer 63 is sandwiched between the outer surface layer 61 and the inner surface layer 62 in the laminating direction, and the outside and the inside of the opening portion 631 (including the port portion 632.) are closed, so that the channel 161 is formed between the outer surface layer 61 and the inner surface layer 62.

As shown in FIG. 5, the inlet 164 and the outlet 165 are formed at positions of the inner surface layer 62 facing the port portions 632. Thus, in a state where the outer surface layer 61, the inner surface layer 62, the intermediate layer 63, and the restriction spacer 64 are laminated, the inlet 164 and the outlet 165 are in communication with the channel 161 from the port portion 632. Through holes are formed at both end portions in the longitudinal direction of the outer surface layer 61, the inner surface layer 62, and the restriction spacer 64 at positions facing each other, and these through holes constitute the insertion holes 166 through which the bolts 19 are inserted.

As shown in FIG. 7, a thickness T1 of the intermediate layer 63 is larger than a thickness T2 of the restriction spacer 64. The intermediate layer 63 is preferably formed of a material having a lower compressive elasticity modulus (Young's modulus), i.e., a softer material than that of the outer surface layer 61, the inner surface layer 62, and the restriction spacer 64. For example, the outer surface layer 61, the inner surface layer 62, and the restriction spacer 64 are formed of stainless steel (SUS), and the intermediate layer 63 is formed of silicon rubber. However, the intermediate layer 63 and the restriction spacer 64 may be made of the same material, or the intermediate layer 63 may have a higher compressive elasticity modulus than the restriction spacer 64.

However, the restriction spacer 64 may be formed of a metal other than SUS such as aluminum. The restriction spacer 64 is not limited to be formed of metal but may be formed of a material other than a metal such as PET or PEEK.

In the following, an example of a method for selecting Young's modulus of the intermediate layer 63 and the restriction spacer 64 will be described with $\sigma$ being the pressure when the channel member 16 is pressed against and fixed to the rotor 14 side by the fixing member 17. In order to prevent the liquid sample in the channel 161 from leaking when the pressure from the liquid sample acts on the channel 161 in the channel member 16, the lower limit value $\sigma 1$ of $\sigma$ is set to a value larger than the estimated maximum pressure. This $\sigma 1$ is the pressure of the liquid sample in the channel 161, and more specifically, it is the sum of the static pressure (pressure applied on the liquid sample in the channel 161 when the rotor is stationary) and the pressure of the liquid sample increased by centrifugal force. As described above, the pressure of the liquid sample in the channel 161 can be classified into 2 types, i.e., a pressure generated from a pipe resistance or the like in a stationary state (static pressure) and a pressure generated by rotating the rotor 14.

The change amount (shrinkage amount) of the thickness T2 of the restriction spacer 64 is denoted by $\delta$. In a state where the pressure from the liquid sample does not act on the channel 161 in the channel member 16, the maximum allowable change amount (shrinkage amount) of the thickness T2 of the restriction spacer 64 is set to $\delta$ max. Assuming that the pressure necessary to further reduce the restriction spacer 64 by the shrinkage amount $\delta$ max after the intermediate layer 63 is compressed is $\sigma 2$, this $\sigma 2$ is an upper limit value of $\sigma$.

A Young's modulus E1 of the intermediate layer 63 and a Young's modulus E2 of the restriction spacer 64 are selected so that σ1<σ2. At this time, σ2 can be expressed by the following expression.

$$\sigma2 = E1 \times (T1-T2+\delta \max)/T1 + E2 \times \delta \max/T2$$

For example, when the intermediate layer 63 is made of a very soft material such as silicon rubber, E1=10 MPa. If the restriction spacer 64 is made of aluminum alloy, E2=70 GPa. When T1=0.3 mm, T2=0.25 mm, and δ max=0.25×1 (%)=0.0025 mm, then σ2=701.75 MPa. When the static pressure is 3 MPa and the hydraulic pressure by the centrifugal force is 8 MPa, then σ1=11 MPa. As a result, since σ1<σ2, the Young's modulus E1 of the intermediate layer 63 and the Young's modulus E2 of the restriction spacer 64 can be determined to be appropriate values. In this case, σ may be a value within a range of σ1<σ<σ2 (for example, about 20 MPa). It is preferable to set the value of σ such that δ≥0 (the restriction spacer 64 shrinks).

On the other hand, it is assumed that the restriction spacer 64 is made of a soft material such as PTFE. In this case, E2=500 MPa and σ2=5 MPa. As a result, since σ1>σ2, it can be determined that the Young's modulus E1 of the intermediate layer 63 and the Young's modulus E2 of the restriction spacer 64 are not appropriate values. However, as in the case where the intermediate layer 63 is not made of silicon rubber, depending on the value of σ1, even if the restriction spacer 64 is made of PTFE, σ1<σ2 may occur.

In the present embodiment, since the intermediate layer 63 is formed of a soft material as described above, when the channel member 16 is pressed toward the rotor 14 by the fixing member 17 at the time of assembling the rotation unit 10 shown in FIG. 3, the intermediate layer 63 is compressed and deformed in the laminating direction by the outer surface layer 61 and the inner surface layer 62. At this time, since the restriction spacer 64 is formed of a material harder than the intermediate layer 63, the intermediate layer 63 is not compressed beyond the thickness T2 of the restriction spacer 64. Thus, the restriction spacer 64 functions as a restriction unit that restricts the channel 161 from being compressed to a height less than the thickness T2 of the restriction spacer 64.

As described above, even when the channel member 16 is compressed and deformed in the laminating direction, the height of the channel 161 can be maintained at a certain height because the restriction spacer 64 can restrict the compression of the channel 161 to a height less than a certain height. Depending on the type of the liquid sample flowing in the channel 161, a member that forms the channel 161 may need to be formed of a soft material such as resin, but even in such a case, the restriction spacer 64 can reliably maintain the height of the channel 161 at a certain height.

The height of the channel 161 can be easily adjusted by arbitrarily setting the thickness of the restriction spacer 64. Furthermore, the height of the channel 161 is less likely to vary during assembly of the channel member 16, and assembly reproducibility is improved.

In particular, in the present embodiment, it is possible to restrict the channel 161 formed in the intermediate layer 63 from being compressed to a height less than a certain height by a simple configuration in which the restriction spacer 64 is only provided between the outer surface layer 61 and the inner surface layer 62. Since the restriction spacer 64 is fixed in a state of surrounding the outer periphery of the intermediate layer 63, the restriction spacer 64 can be prevented from falling off without fixing the restriction spacer 64 by adhesion or the like. In this case, since variations in the height of the channel 161 according to the thickness of the adhesive can be prevented, the height of the channel 161 can be maintained at a certain height with higher accuracy.

On the other hand, the outer surface layer 61, the inner surface layer 62, and the intermediate layer 63 may be adhered to one another. In this case, if the outer surface layer 61, the inner surface layer 62, and the intermediate layer 63 are curved in an arc shape in advance and then adhere to one another, the respective layers are less likely to be peeled off than in the case where the outer surface layer 61, the inner surface layer 62, and the intermediate layer 63 are curved after adhesion. Even when the outer surface layer 61, the inner surface layer 62, and the intermediate layer 63 adhere to one another as described above, since the height of the channel 161 is defined by the thickness of the restriction spacer 64, it is possible to prevent the thickness of the adhesive from affecting the height of the channel 161.

Since the outer surface layer 61, the inner surface layer 62, and the intermediate layer 63 can adhere to one another, the bonding method is not limited to a bonding method in which the respective layers are formed of metal and are diffused and adhere to one another. As a result, the width of the materials usable as the outer surface layer 61, the inner surface layer 62, and the intermediate layer 63 constituting the channel member 16 is increased, and hence the channel 161 according to the type of the liquid sample can be configured. In this case, as the adhesion method for the outer surface layer 61, the inner surface layer 62, and the intermediate layer 63, a method using molecular adhesion, plasma treatment, or the like can be exemplified. However, the configuration is not limited to the above, and it is also possible to adopt a configuration in which the restriction spacer 64 is adhered to the outer surface layer 61 or the inner surface layer 62.

Figure 8:
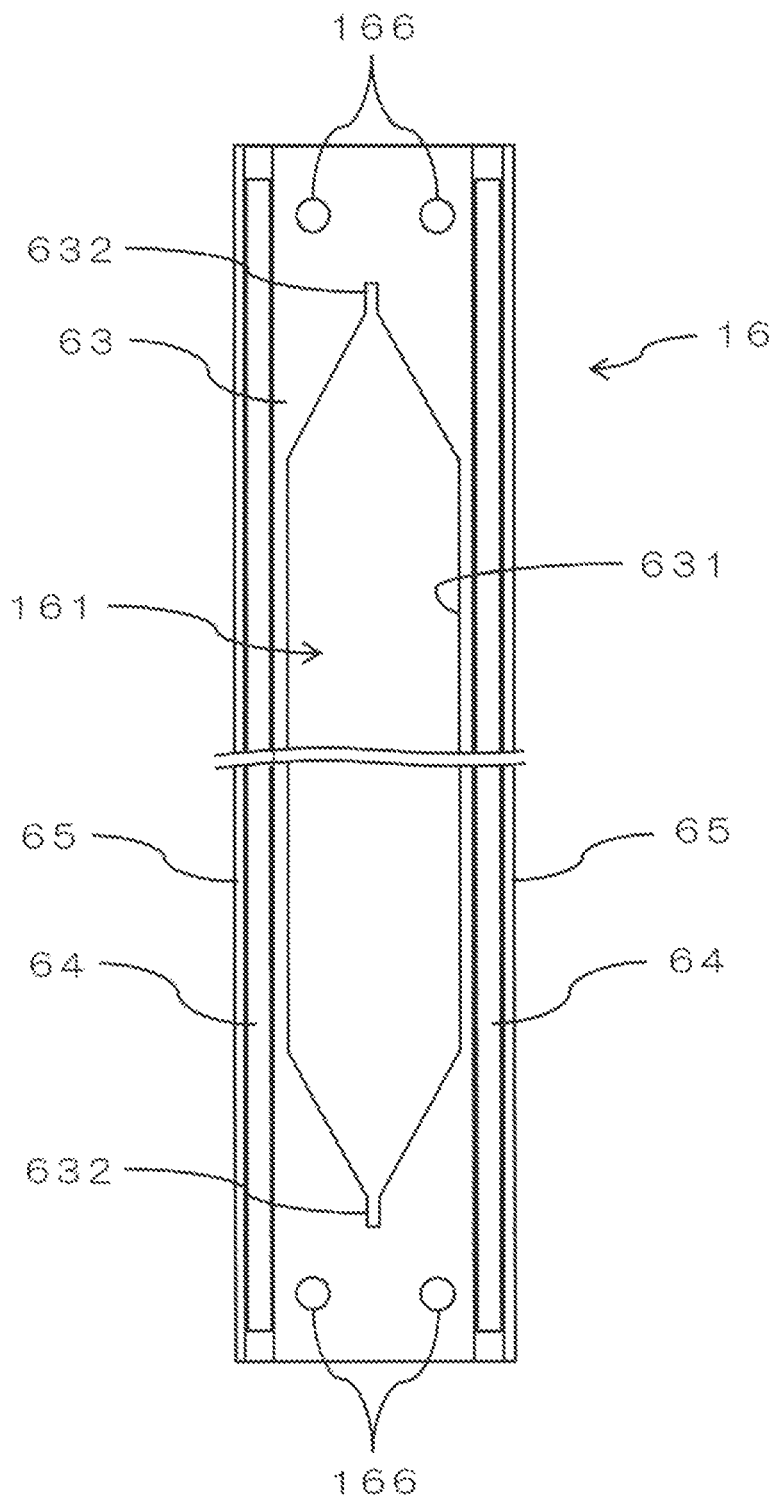
FIG. 8 is a plan view of an intermediate layer and a restriction spacer showing a first variation of the channel member.

FIG. 8 is a plan view of the intermediate layer 63 and the restriction spacer 64 showing a first variation of the channel member 16. In the above embodiment, the configuration has been described in which the restriction spacer 64 is provided between the outer surface layer 61 and the inner surface layer 62 while surrounding the intermediate layer 63 in a state where the channel member 16 is assembled. On the other hand, the example of FIG. 8 is different from the embodiment described above in that a positioning unit 65 that positions the restriction spacer 64 with respect to the intermediate layer 63 is provided, and the other components are the same as those of the embodiment described above. Thus, the similar components are given the same reference numerals in the drawings and the detailed description thereof is omitted.

The positioning unit 65 is constituted by a projection provided along a direction in which the intermediate layer 63 extends (longitudinal direction), and by sandwiching and positioning the restriction spacer 64 between the positioning unit 65 and the intermediate layer 63, the restriction spacer 64 can be prevented from falling off without fixing the restriction spacer 64 by adhesion or the like. In this case, since variations in the height of the channel 161 according to the thickness of the adhesive can be prevented, the height of the channel 161 can be maintained at a certain height with higher accuracy.

In the example of FIG. 8, a pair of positioning units 65 are provided so as to face both side edges with respect to the intermediate layer 63, and the elongated restriction spacer 64 is positioned between each of the positioning units 65 and the intermediate layer 63 along a direction in which the intermediate layer 63 extends (longitudinal direction). The positioning unit 65 may be constituted of a separate member from the outer surface layer 61 and the inner surface layer 62 and fixed to the outer surface layer 61 or the inner surface layer 62, or may be constituted integrally with the outer surface layer 61 or the inner surface layer 62. However, the configuration is not limited to that described above, and for example, at least one of the restriction spacer 64 and the positioning unit 65 may be divided into a plurality of portions along a direction in which the intermediate layer 63 extends (longitudinal direction).

Figure 9:
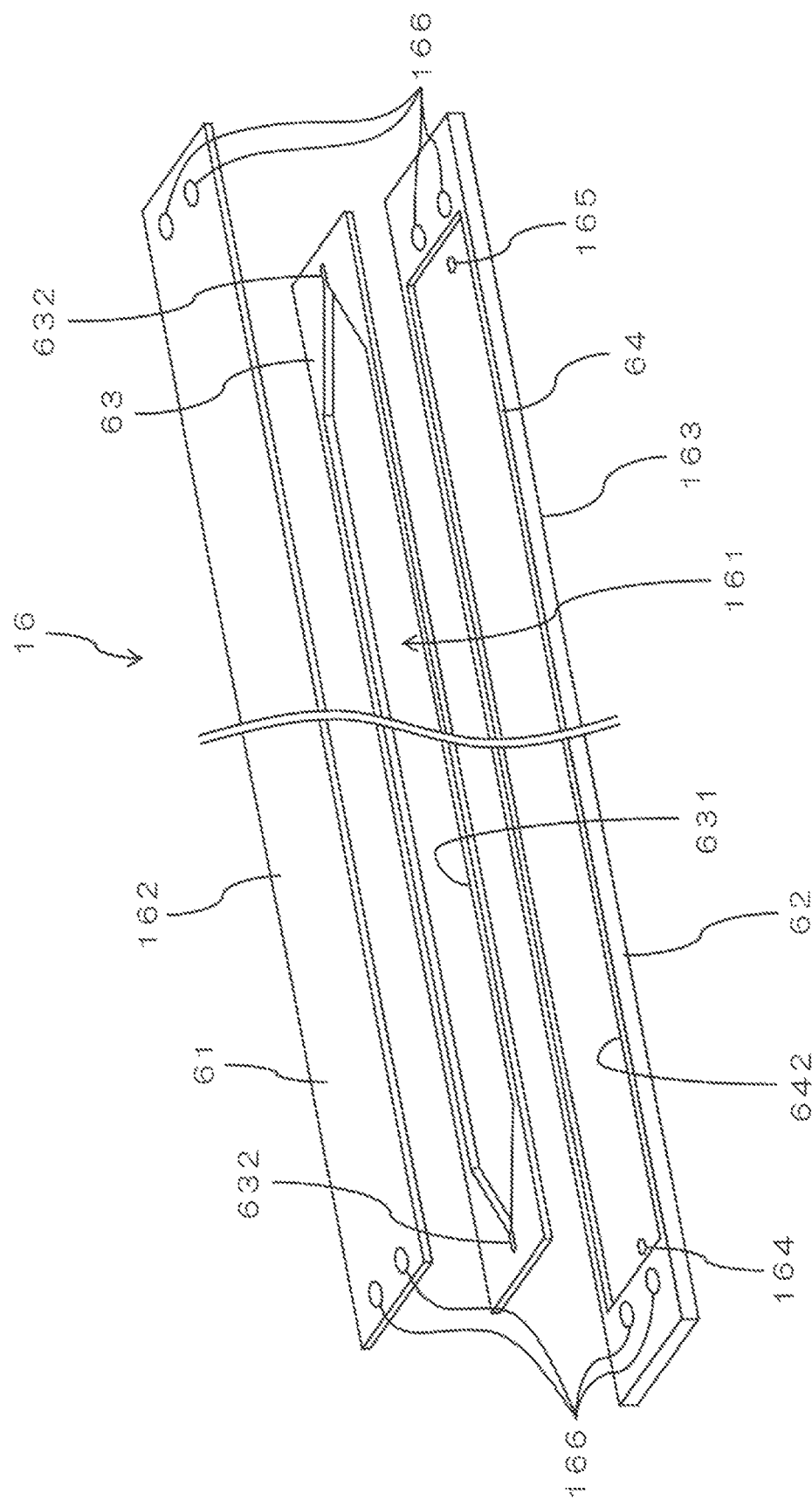
FIG. 9 is an exploded perspective view showing a second variation of the channel member, showing, as viewed from the outer peripheral surface side, a state before the channel member is curved in an arc shape.
Figure 10:
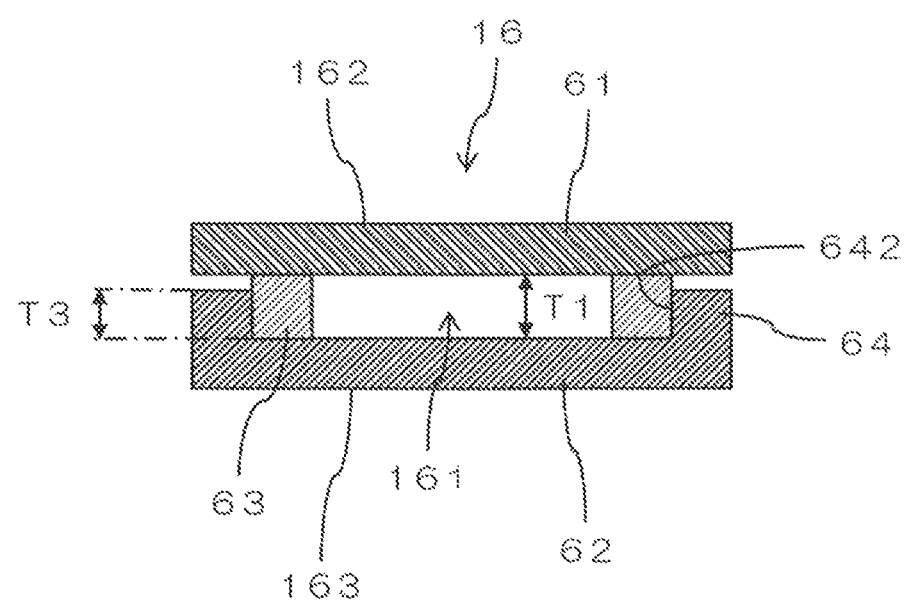
FIG. 10 is a sectional view of the channel member assembled in the second variation.

FIG. 9 is an exploded perspective view showing a second variation of the channel member 16, showing, as viewed from the outer peripheral surface 162 side, a state before the channel member 16 is curved in an arc shape. FIG. 10 is a sectional view of the channel member 16 assembled in the second variation. In the channel member 16 in this example, the inner surface layer 62 and the restriction spacer 64 are not constituted of separate members as in the above embodiment, but the inner surface layer 62 and the restriction spacer 64 are constituted integrally.

Specifically, on the surface of the inner surface layer 62 on the outer surface layer 61 side, a rectangular recess 642 having a shape same as or slightly larger than the outer shape of the intermediate layer 63 in plan view is formed, and the intermediate layer 63 is disposed in the recess 642. Thus, the peripheral edge portion of the recess 642 in the inner surface layer 62 functions as the restriction spacer 64. Other configurations are the same as those in the above embodiment except for this point, and therefore the same reference numerals are given to the same configurations, and a detailed description thereof is omitted.

The thickness T1 of the intermediate layer 63 is larger than a thickness T3 (depth of the recess 642) of the restriction spacer 64 in the inner surface layer 62. The intermediate layer 63 is formed of a material having a lower compressive elasticity modulus (Young's modulus), i.e., a softer material than the outer surface layer 61 and the inner surface layer 62. For example, the outer surface layer 61 and the inner surface layer 62 are formed of stainless steel (SUS), and the intermediate layer 63 is formed of silicon rubber.

However, the inner surface layer 62 may be formed of a material having a higher compressive elastic modulus than at least that of the intermediate layer 63, and may be formed of a metal other than SUS such as aluminum. The inner surface layer 62 is not limited to be formed of metal but may be formed of a material other than a metal such as a resin having a high compression elasticity modulus such as PET or PEEK.

In the examples shown in FIGS. 9 and 10, it is possible to restrict the channel 161 from being compressed to a height less than a certain height by a simple configuration in which the restriction spacer 64 is provided in the inner surface layer 62. However, the restriction spacer 64 is not limited to the configuration provided on the inner surface layer 62, and it may be provided on the outer surface layer 61 or on both the outer surface layer 61 and the inner surface layer 62.

Figure 11:
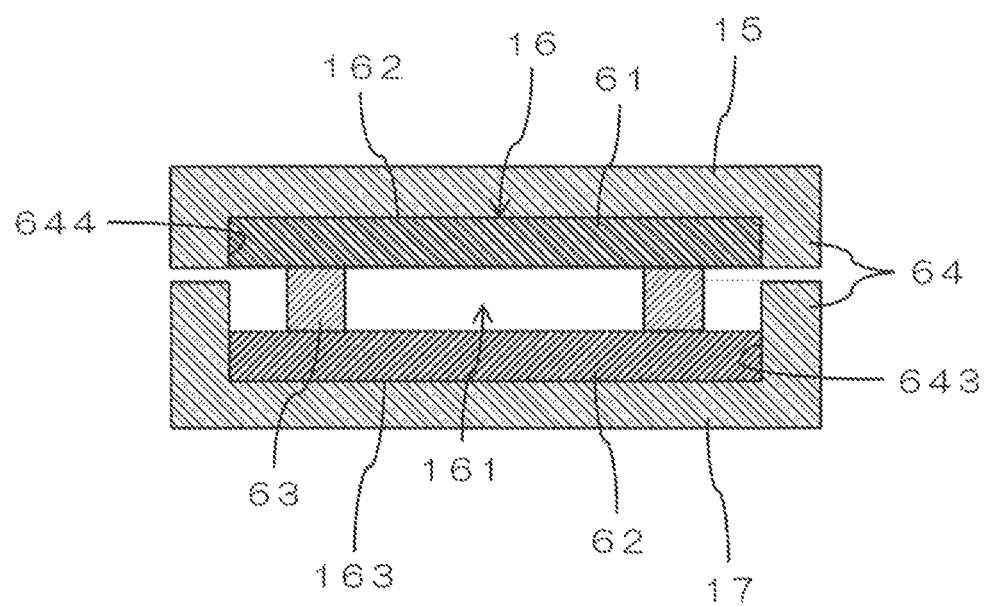
FIG. 11 is a sectional view showing a third variation of the channel member.

FIG. 11 is a sectional view showing a third variation of the channel member 16. In this example, the restriction spacer 64 is not provided in the channel member 16 as in the above embodiment, but is provided in the fixing member 17 and the spacer 15, which are members other than the channel member 16 constituting the rotation unit 10.

Specifically, on the surface of the fixing member 17 on the channel member 16 side, a rectangular recess 643 having a shape same as or slightly larger than the outer shape of the inner surface layer 62 of the channel member 16 in plan view is formed, and the inner surface layer 62 is disposed in the recess 643. On the surface of the spacer 15 on the channel member 16 side, a rectangular recess 644 having a shape same as or slightly larger than the outer shape of the outer surface layer 61 of the channel member 16 in plan view is formed, and the outer surface layer 61 is disposed on the recess 644. Thus, the peripheral edge portion of the recess 643 in the fixing member 17 and the peripheral edge portion of the recess 644 in the spacer 15 function as the restriction spacer 64. Other configurations are the same as those in the above embodiment except for this point, and therefore the same reference numerals are given to the same configurations, and a detailed description thereof is omitted.

The fixing member 17 and the spacer 15 constitute a compression unit that compresses the channel member 16 in the laminating direction. That is, this example assumes a configuration in which the restriction spacer 64 is provided in the compression unit. The depth of the recess 643 in the fixing member 17 is larger than the thickness of the inner surface layer 62 of the channel member 16 and smaller than the total thickness of the inner surface layer 62 and the intermediate layer 63. The depth of the recess 644 in the spacer 15 is the same as the thickness of the outer surface layer 61 of the channel member 16. The intermediate layer 63 is formed of a material having a lower compressive elasticity modulus (Young's modulus), i.e., a softer material than the fixing member 17 and the spacer 15.

In the example of FIG. 11, when the channel member 16 is compressed by the fixing member 17 and the spacer 15 in the laminating direction, the peripheral edge portions of the recesses 643 and 644 of the fixing member 17 and the spacer 15 come in contact with each other in the process of compressing and deforming the intermediate layer 63, and cannot be further compressed. Therefore, it is possible to restrict the channel 161 from being compressed to a height less than a certain height.

Figure 12:
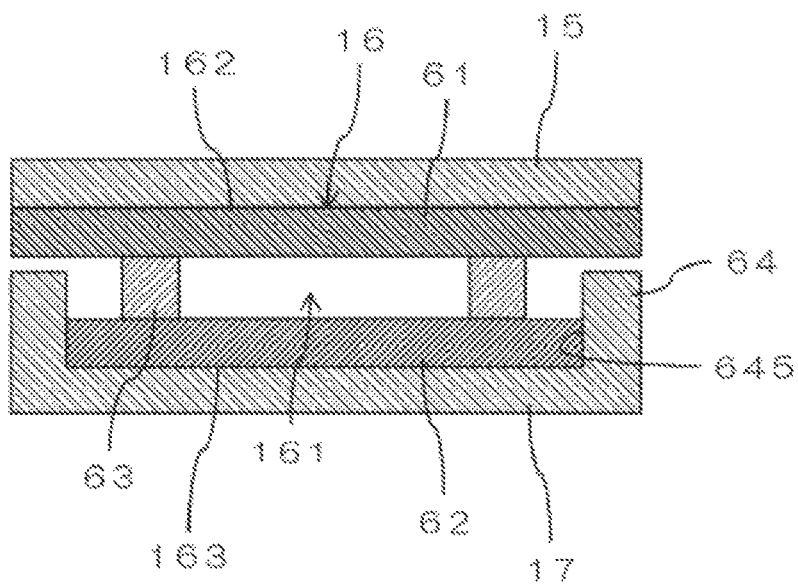
FIG. 12 is a sectional view showing a fourth variation of the channel member.

FIG. 12 is a sectional view showing a fourth variation of the channel member 16. In this example, similarly to the third variation, the restriction spacer 64 is provided on a member other than the channel member 16 constituting the rotation unit 10, but is different from the third variation in that it is provided only on the fixing member 17.

Specifically, on the surface of the fixing member 17 on the channel member 16 side, a rectangular recess 645 having a shape same as or slightly larger than the outer shape of the inner surface layer 62 of the channel member 16 in plan view is formed, and the inner surface layer 62 is disposed in the recess 645. The width of the outer surface layer 61 in the channel member 16 is larger than the width of the inner surface layer 62. Thus, the peripheral edge portion of the recess 645 in the fixing member 17 functions as the restriction spacer 64. Other configurations are the same as those in the above embodiment except for this point, and therefore the same reference numerals are given to the same configurations, and a detailed description thereof is omitted.

The fixing member 17 constitutes a compression unit that compresses the channel member 16 in the laminating direction. That is, this example assumes a configuration in which the restriction spacer 64 is provided in the compression unit. The depth of the recess 645 in the fixing member 17 is larger than the thickness of the inner surface layer 62 of the channel member 16 and smaller than the total thickness of the inner surface layer 62 and the intermediate layer 63. The intermediate layer 63 is formed of a material having a lower compressive elasticity modulus (Young's modulus), i.e., a softer material than the fixing member 17 and the outer surface layer 61.

In the example of FIG. 12, when the channel member 16 is compressed by the fixing member 17 and the spacer 15 in the laminating direction, the peripheral edge portion of the recess 645 of the fixing member 17 comes in contact with the outer surface layer 61 of the channel member 16 in the process of compressing and deforming the intermediate layer 63, and cannot be further compressed. Therefore, it is possible to restrict the channel 161 from being compressed to a height less than a certain height.

Although the configuration in which the restriction spacer 64 is provided only on the fixing member 17 in the compression unit has been described, the configuration in which the restriction spacer 64 is provided only on the spacer 15 in the compression unit may be adopted. Further, the compression unit is not limited to the one constituted of the fixing member 17 and the spacer 15, but may be constituted of another member, and in this case, the restriction spacer 64 may be provided on the other member constituting the compression unit.

In the above embodiment, the configuration in which the one channel 161 extends straight has been described. However, the configuration is not limited to this, and a bent portion or a curved portion may be formed in a part of the channel 161. Alternatively, instead of the one channel 161, two or more channels may be formed.

The layers constituting the channel member 16 are not limited to the configuration as in the above embodiment. For example, a plurality of intermediate layers 63 may be laminated between the outer surface layer 61 and the inner surface layer 62.

DESCRIPTION OF REFERENCE SIGNS

1 centrifugal field-flow fractionation device
2 carrier storage unit
3 liquid feed pump
4 rotary valve
5 sample injection device
6 detector
7 carrier collection unit
10 rotation unit
11 rotational shaft
12 introduction unit
13 discharge unit
14 rotor
15 spacer
16 channel member
17 fixing member
18 wedge-shaped member
19 bolt
20 holding table
30 protective wall
40 motor
50 control unit
61 outer surface layer
62 inner surface layer
63 intermediate layer
64 restriction spacer
65 positioning unit
161 channel
162 outer peripheral surface
163 inner peripheral surface
164 inlet
165 outlet
166 insertion hole
631 opening
632 port portion
641 opening
642 to 645 recess

The invention claimed is:

1. A centrifugal field-flow fractionation device comprising:
    an annular rotor that rotates about a rotational axis;
    an arc-shaped channel member that is provided along an inner peripheral surface of the rotor, has therein a channel for a liquid sample by laminating a plurality of layers, and has an inlet for the liquid sample to the channel and an outlet for the liquid sample from the channel;
    a rotation drive unit that, by rotating the rotor, classifies particles in the liquid sample in the channel by centrifugal force; and
    a restriction unit that restricts the channel from being compressed to a height equal to or less than a certain height when the channel member is compressed and deformed in a laminating direction,
    wherein the plurality of layers include an outer surface layer provided on a rotor side, an inner surface layer provided on a rotational axis side, and an intermediate layer provided between the outer surface layer and the inner surface layer and forming a surface defining the channel between the outer surface layer and the inner surface layer,
    wherein the restriction unit is provided apart from the outer surface layer, the inner surface layer and the intermediate layer, and the intermediate layer is formed of a material having a lower compressive elasticity modulus than that of the restriction unit.

2. The centrifugal field-flow fractionation device according to claim 1, wherein
    the restriction unit is provided between the outer surface layer and the inner surface layer.

3. The centrifugal field-flow fractionation device according to claim 2, wherein the restriction unit is provided between the outer surface layer and the inner surface layer while surrounding an outer periphery of the intermediate layer.

4. The centrifugal field-flow fractionation device according to claim 2, further comprising a positioning unit that positions the restriction unit with respect to the intermediate layer.

5. The centrifugal field-flow fractionation device according to claim 1, wherein
    the plurality of layers include the outer surface layer provided on the rotor side and the inner surface layer provided on the rotational axis side, and
    the restriction unit is provided on at least one of the outer surface layer and the inner surface layer.

6. The centrifugal field-flow fractionation device according to claim 1, further comprising
    a compression unit that compresses the channel member in a laminating direction,
    wherein the restriction unit is provided in the compression unit.

7. The centrifugal field-flow fractionation device according to claim 1, further comprising a pump configured to provide a first pressure to the liquid sample, and the rotation drive unit is configured to rotate the rotor as a speed to provide a second pressure from centrifugal force of the liquid sample
    wherein the restriction unit is formed of a material such that a pressure $\sigma$ when the channel member is compressed in a laminating direction is larger than a lower limit value $\sigma 1$, which is a pressure of the liquid sample in the channel, and smaller than an upper limit value $\sigma 2$, which is a pressure necessary to reduce the restriction unit by a predetermined shrinkage amount when a pressure from the liquid sample in the channel does not act,
wherein the pressure of the liquid sample includes both the first pressure and the second pressure.

* * * * *